US008896747B2

(12) United States Patent
Tzur

(10) Patent No.: US 8,896,747 B2
(45) Date of Patent: Nov. 25, 2014

(54) DEPTH ESTIMATION BASED ON INTERPOLATION OF INVERSE FOCUS STATISTICS

(71) Applicant: QUALCOMM Technologies, Inc., San Diego, CA (US)

(72) Inventor: Meir Tzur, Haifa (IL)

(73) Assignee: QUALCOMM Technologies, Inc., San Diego, CA (US)

( * ) Notice: Subject to any disclaimer, the term of this patent is extended or adjusted under 35 U.S.C. 154(b) by 111 days.

(21) Appl. No.: 13/675,944

(22) Filed: Nov. 13, 2012

(65) Prior Publication Data

US 2014/0132791 A1 May 15, 2014

(51) Int. Cl.
*H04N 5/232* (2006.01)
*H04N 5/228* (2006.01)
*B60Q 1/00* (2006.01)
*H04N 5/225* (2006.01)

(52) U.S. Cl.
CPC ........................... *H04N 5/225* (2013.01)
USPC ................ 348/345; 348/222.1; 340/435

(58) Field of Classification Search
USPC ............... 348/345, 222.1; 340/435
See application file for complete search history.

(56) References Cited

U.S. PATENT DOCUMENTS

| 4,804,831 A | 2/1989 | Baba et al. |
| 4,933,700 A | 6/1990 | Ikeda et al. |
| 5,005,956 A | 4/1991 | Kaneda et al. |
| 5,070,353 A | 12/1991 | Komiya et al. |
| 5,144,357 A | 9/1992 | Ishida et al. |
| 5,148,209 A | 9/1992 | Subbarao |
| 5,151,609 A | 9/1992 | Nakagawa et al. |
| 5,193,124 A | 3/1993 | Subbarao |
| 5,231,443 A | 7/1993 | Subbarao |
| 5,369,461 A | 11/1994 | Hirasawa et al. |
| 5,475,429 A | 12/1995 | Kodama |
| 5,793,900 A | 8/1998 | Nourbakhsh et al. |

(Continued)

FOREIGN PATENT DOCUMENTS

JP 62284314 A 12/1987
JP 63127217 A 5/1988

OTHER PUBLICATIONS

Sewlochan, Ray, "Iterative Depth From Defocus (I-DFD) Algorithms" The University of British Columbia, Apr. 1995, <https://circle.ubc.ca/bitstream/2429/3716/1/ubc_1995-0270.pdf>, Accessed Oct. 28, 2009.

(Continued)

*Primary Examiner* — Joel Fosselman
(74) *Attorney, Agent, or Firm* — Knobbe, Martens, Olson & Bear LLP

(57) ABSTRACT

Embodiments are directed towards performing depth estimation within a digital camera system based on interpolation of inverse focus statistics. After an image is captured, various statistics or focus measure may be calculated using, for example, a high pass filter. Depth is estimated by interpolating the inverse of the statistics for three positions of focus for the image. The inverse of the statistics, St(n), may be 1/St(n), or $1/St^2(n)$, or even $1/St^Z(n)$, where $Z \geq 1$. Several approaches to interpolating the inverse values of the statistics to obtain a depth estimate are disclosed, including a general parabolic minimum approach, using a parabolic minimum within a progressive scheme, or within a continuous AF scheme. The depth estimate may then be used for a variety of applications, including automatic focusing, as well as converting 2D images to 3D images.

20 Claims, 7 Drawing Sheets

(56) References Cited

U.S. PATENT DOCUMENTS

| | | | |
|---|---|---|---|
| 6,269,197 | B1 | 7/2001 | Wallack |
| 7,389,042 | B2 | 6/2008 | Lin et al. |
| 8,218,061 | B2 | 7/2012 | Baxansky |
| 2003/0063815 | A1 | 4/2003 | Watanabe |
| 2004/0000991 | A1* | 1/2004 | Schiffmann et al. ........ 340/435 |
| 2005/0218231 | A1 | 10/2005 | Massieu |
| 2006/0181644 | A1 | 8/2006 | De Haan |
| 2008/0075444 | A1 | 3/2008 | Subbarao et al. |
| 2008/0095312 | A1 | 4/2008 | Rodenburg et al. |
| 2008/0211959 | A1 | 9/2008 | Balram et al. |
| 2008/0297648 | A1 | 12/2008 | Furuki et al. |
| 2010/0053417 | A1 | 3/2010 | Baxansky |
| 2011/0181770 | A1 | 7/2011 | Rapaport et al. |

OTHER PUBLICATIONS

Ziou, D., et al. "Depth From Defocus Estimation in Spatial Domain" Computer Vision and Image Understanding, vol. 81, No. 2, p. 143-165, Feb. 2001.

Asada, N., et al. "Depth From Blur by Zooming" Proc. Vision Interface, p. 165-172, 2001.

Pentland, A. "A New Sense for Depth of Field" IJCAI, p. 988-994, 1985.

Gokstorp, M. "Computing Depth From Out-Of-Focus Blur Using a Local Frequence Representation" Proceedings of International Conference on Pattern Recognition, vol. 1, p. 153-158, 1994.

Watanabe, M., et al. "Real-Time Computation of Depth From Defocus" Proceedings of SPIE: Three-Dimensional and Unconventional Imaging for Industrial Inspection and Metrology, 2599, A-03, Nov. 1995.

Watanabe, M., et al. "Rational Filters for Passive Depth From Defocus" International Journal of Computer Vision, vol. 27, issue 3, May 1998.

Subbarao, M., et al. "Depth From Defocus and Rapid Autofocusing: A Practical Approach" in Proc. CVPR, p. 73-776, 1992.

Subbarao, M., et al. "Depth From Defocus: A Spatial Domain Approach" International Journal of Computer Vision, vol. 13, No. 3, p. 271-294, Dec. 1994.

Xiong, Y., et al. "Depth From Focusing and Defocusing" Carnegie Mellon University, 28 pages, Mar. 1993.

Subbarao, M. "Parallel Depth Recovery by Changing Camera Parameters" Second International Conference on Computer Vision, p. 149-155, Dec. 1988.

Nayar, S.K., et al. "Real-Time Focus Range Sensor" IEEE Transactions on Pattern Analysis and Machine Intelligence, vol. 18, No. 12, Dec. 1996.

Bove, Jr., V.M. "Entropy-Based Depth From Focus" Journal of the Optical Society of America, A, 10, p. 561-566, Apr. 1993.

Official Communication for U.S. Appl. No. 13/183,363 mailed Apr. 25, 2013.

Official Communication for U.S. Appl. No. 13/183,363 mailed Jan. 8, 2013.

International Search Report and Written Opinion for International Patent Application No. PCT/US2009/056002 mailed Nov. 17, 2009.

International Search Report and Written Opinion for International Patent Application No. PCT/US2010/045927 mailed Oct. 8, 2010.

International Preliminary Report on Patentability for International Patent Application No. PCT/US2010/045927 mailed Aug. 9, 2012.

Official Communication for U.S. Appl. No. 12/409,416 mailed May 2, 2012.

Official Communication for U.S. Appl. No. 12/409,416 mailed Jan. 11, 2012.

Official Communication for U.S. Appl. No. 12/857,343 mailed Nov. 6, 2012.

Official Communication for U.S. Appl. No. 12/857,343 mailed May 24, 2013.

Official Communication for U.S. Appl. No. 13/183,363 mailed Sep. 27, 2013.

* cited by examiner

DEPTH ESTIMATION BASED ON INTERPOLATION OF INVERSE FOCUS STATISTICS

TECHNICAL FIELD

The present embodiments relate generally to digital image processing and, more particularly, but not exclusively, to at least using a digital camera to perform a depth estimation based on inverse focus statistics, usable for automatic focusing (AF), or other purposes, such as 2-dimensional (2D) to 3D conversion.

BACKGROUND

Many imaging devices today employ automatic focus (AF) to allow for automatic adjustment of the imaging device to capture image data. For example, some types of AF systems are based on depth from focus or DFF. Many DFF approaches might capture image data for each of a plurality of focal positions of a scene. The sharpness of each focal position may then be analyzed to determine the sharpest focal position, which may be that focal position with the highest sharpness metric. As a result of the sharpness determination, the imaging device may automatically set the focus for subsequent image capture. However, this approach often requires capturing and analyzing a large number of images. The resulting analysis may then result in a significant period of delay before automatic focus may then be performed. For example, consider capturing images at 30 frames per sec, with 100 locations or different focal positions. This could then result in at least three seconds having elapsed before automatic focusing might begin. Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present embodiments, reference will be made to the following Detailed Description, which is to be read in association with the accompanying drawings, in which.

DETAILED DESCRIPTION OF THE EMBODIMENTS

Figure 1:
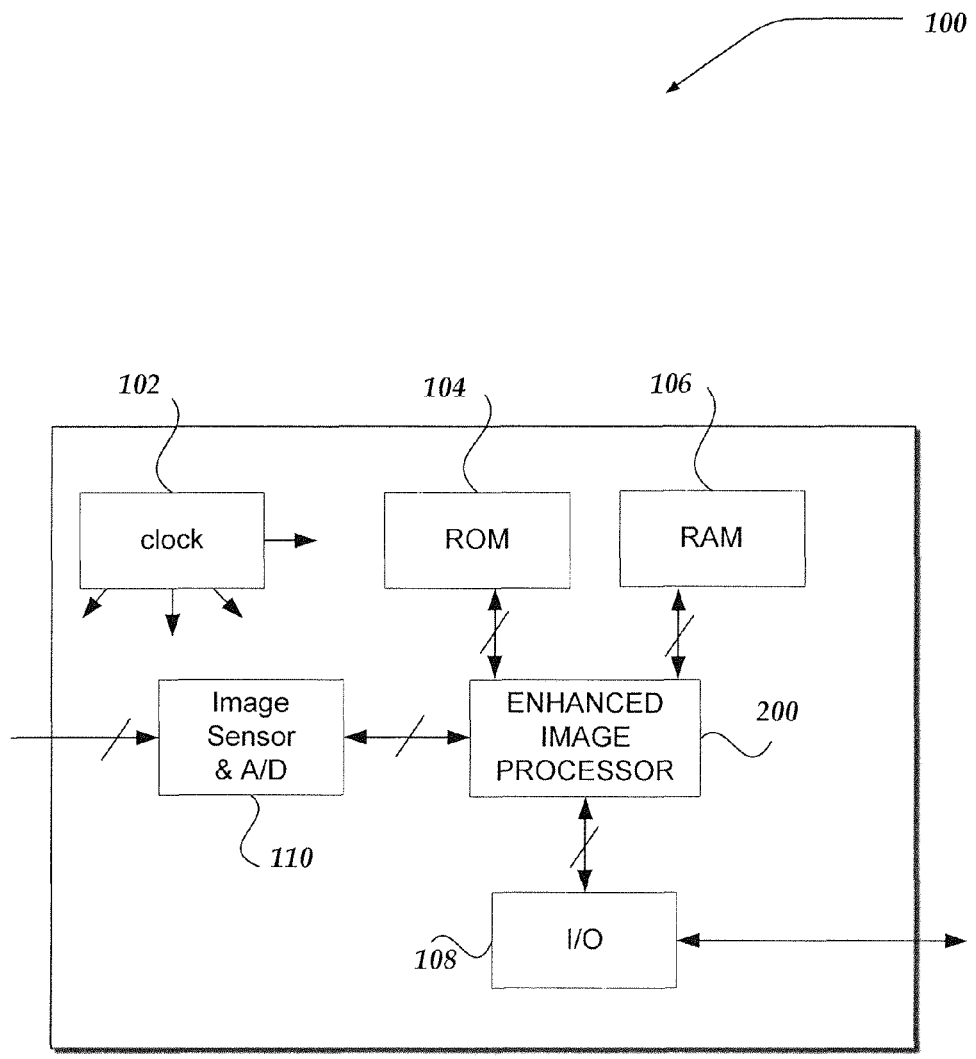
FIG. 1 illustrates a system diagram of one embodiment of an environment in which the embodiments may be practiced.

The present embodiments now will be described more fully hereinafter with reference to the accompanying drawings, which form a part hereof, and which show, by way of illustration, specific aspects in which the embodiments may be practiced. These embodiments may, however, take many different forms and should not be construed as limited to the embodiments set forth herein; rather, these embodiments are provided so that this disclosure will be thorough and complete, and will fully convey the scope to those skilled in the art. Among other things, the present embodiments may include methods or devices. Accordingly, the present embodiments may take the form of entirely hardware or a combination of software and hardware aspects. Moreover, as used herein the terms "circuit" and "module" will be used interchangeably to indicate a processing element that executes an operation on an input signal and provides an output signal therefore regardless of the hardware or software form of its implementation. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "image," or "image data," refers to data that defines an image to be displayed in at least two dimensions, and may take the form of a single display of the image, or a time varying display of a sequence of images comprising multiple video frames which may be spaced in time.

The following briefly describes the embodiments in order to provide a basic understanding of some aspects. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, the subject innovations are directed towards performing depth estimation within a digital camera system based on interpolation of inverse focus statistics. After an image is captured, various statistics or focus measure may be calculated using, for example, a high pass filter and then combining values over a predefined window for the image. Given a subset of focusing points for the image, depth is estimated by interpolating the inverse of the statistics. As used herein, the estimated depth refers to units of focus position. In one embodiment, the subset of points is three points selected based on defined characteristics of the digital camera system. The inverse of the statistics, St(n), may be 1/St(n). However, in some embodiments, the inverse of the statistics can be $1/St^2(n)$. Several approaches to interpolating the inverse values of the statistics to obtain a depth estimate are disclosed, including a general parabolic minimum approach, using a parabolic minimum within a progressive scheme, or within a continuous AF scheme. The depth estimate may then be used for a variety of applications, including automatic focusing, as well as converting 2D images to 3D images.

Illustrative Operating Environments

FIG. 1 shows components of an environment in which embodiments may be practiced. Not all the components may be required to practice the embodiments, and variations in the arrangement and type of the components may be made without departing from the spirit or scope of the invention. Moreover, various implementations of the system may include many more or less components than those shown in FIG. 1. However, the components shown are sufficient to disclose an illustrative embodiment for practicing the present invention.

As shown, system 100 of FIG. 1 may represent a camera or any of a variety of other possible portable devices, including cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like, that may be configurable to capture and process images. In one embodiment, system 100 may include components not shown, such as a lens or other optical elements, and image sensor(s) for receiving images that may be converted into a digital image for processing and subsequent storage within one or more non-transitory (physical) storage devices.

As shown, system 100 may include components on a single integrated circuit chip or on a plurality of different circuit chips. In any event, components shown in FIG. 1 include a clock circuit 102 for providing clocking signals to the circuit chips and other components. While illustrated as a separate component, it should be understood that clock circuit 102 may also be included on Enhanced Image Processor (EIP) 200, or the like.

Also shown is a volatile random-access memory (RAM) circuit chip 106 that may be coupled to EIP 200 to provide temporary data storage. In one embodiment, RAM 106 may be configured to receive and store image data, such as one or more frames of image data for use by EIP 200 or output data from EIP 200, as well as to store various statistics about an image, depth estimation statistics, data representing various characteristics of system 100, and the like. A separate non-volatile read-only memory (ROM) memory chip 104 is also coupled to EIP 200 and may be employed for storage of a processor program, calibration data, look-up tables (LUTS), non-linear functions, and a variety of other data useable by system 100. In one embodiment, ROM 104 may be flash memory, which is re-programmable, or a memory that is programmable once, such as programmable read-only memory (PROM), electrically programmable read-only memory (EEPROM), or any of a variety of other storage devices.

Although not illustrated, other type of memory or physical storage devices may be included within system 100, including, for example, memory cards that may, include semi-conductor flash electrically erasable and programmable read-only memory, removable rotating magnetic disk storage, removable universal serial bus (USB) devices, or any of a variety of other storage devices. In one embodiment, system 100 may also be configured through Input/Output (I/O) device 108 to access storage devices that may be external to system 100. Thus, it should be understood that EIP 200 may be configured to receive one or more frames of image data, operate upon the received one or more frames of image data to obtain depth estimates useable to capture subsequent images, and/or perform a variety of other actions on image data, and store or otherwise send a resulting compressed (encoded) bit-stream of image data using a variety of storage devices, and/or communication mechanisms, and therefore is not limited to merely those described herein.

I/O device 108 includes circuitry for coupling system 100 to one or more external devices, networks or the like, and is constructed for use with one or more communication protocols and technologies, including any of a variety of communication protocols and technologies useable for communicating images, including images to and/or from system 100. In one embodiment, I/O device 108 is sometimes known as a transceiver, transceiving device, or network interface card (NIC).

I/O device 108 may also provide for various other communications, including for use various input devices, such as keypads, touch screens, or the like, as well as output devices including screen displays, audio outputs, or the like. Thus, although not shown, system 100 may also include a speaker and/or microphone that may be coupled to I/O device 108 to enable communications. System 100 may also include a display that may include a liquid crystal display (LCD), gas plasma, light emitting diode (LED), or any other type of display usable for providing text and/or an image for display. Further, in one embodiment, the display may also include a touch sensitive screen arranged to receive input from an object such as a stylus or a digit from a human hand.

Also illustrated, is an image sensor & analog-to-digital converter (A/D) that may be configured to receive an analog signal representing an image, and to convert the received signal into digital image data that, in one embodiment, may be a sequence of individual blocks of digital image data representing an intensity of light that may be received through various photo-detectors of an image sensor and/or lens arrangement (not shown). Image sensor & A/D 110 may then provide the digital data to EIP 200 for processing. In one embodiment, the data received by EIP 200 may be in a raw Bayer format. However, other data formats may also be used, including, for example, the image data may be defined by three components of the image signal; namely, a luminance component (Y), and two complementary chrominance (color differences) components (V=R−Y) and (U=B−Y). In some embodiments, output from EIP 200 may be useable by image sensor & A/D to perform autofocus actions, and/or otherwise modify various image capture parameters, such as focus position, lighting, shutter capture speeds, or the like.

Figure 2:
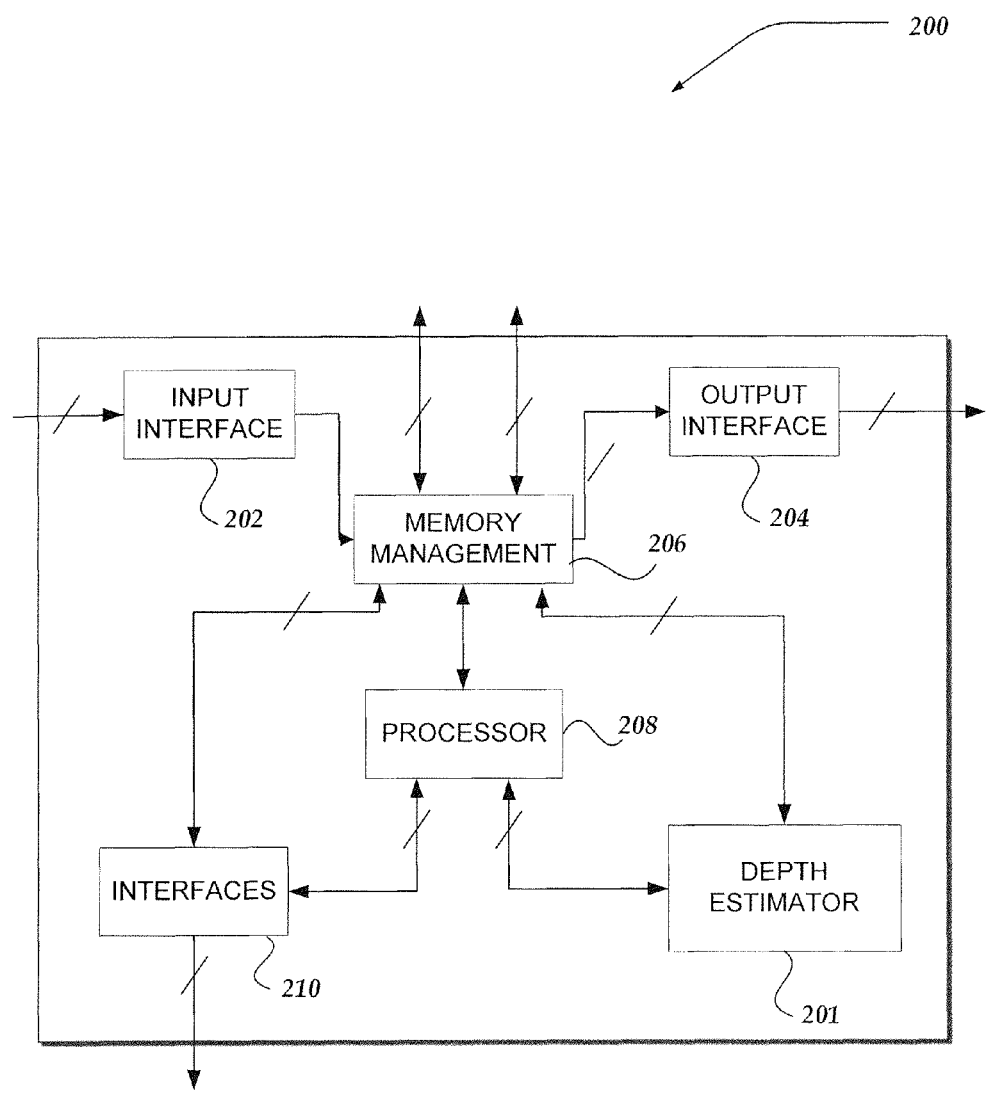
FIG. 2 shows one embodiment of an enhanced image processor usable for practicing various embodiments.

One embodiment of EIP 200 is shown in FIG. 2. EIP 200 may include many more or less components than those shown. The components shown, however, are sufficient to disclose an illustrative embodiment for practicing various embodiments.

As shown in FIG. 2, EIP 200 may include processor 208 that may represent a general purpose or a specialized central processing unit (CPU) that is configured to perform a variety of calculations on an image and/or sequence of images and to control various operations of system 100 in response to computer-readable instructions that may be stored within one of the memory devices of FIG. 1, such as ROM 104, or the like. In one embodiment, digital data of one or more image frames may be received by input interface circuit 202 and communicated to other components by connection through memory management device 206. In one embodiment, depth estimator 201 may be employed as described further below, to receive captured image data, and/or various statistics about the image data. Depth estimator 201 may then employ the statistics, and other information about the captured images to determine an estimate for a focus. During operation of depth estimator 201, in some embodiments, commands may be issued requesting additional image data be captured, modifying a focal position for capturing an image, and/or providing depth estimates usable during an autofocus operation, conversion of 2D images into 3D images, or any of a variety of other actions that may employ an estimate of depth. In any event, a resulting captured image may further be encoded as a compressed bit-stream representing the three dimensional image that may be output through output interface circuit 204 to various memory storage devices, or even over a network, including, a wireless and/or wired network, to another device.

Interfaces 210 may provide for various mechanisms to communicate with processor 208 and/or memory management 206, other components, to enable modifications to various actions, provide status of an action, or the like by another device, an end-user, or the like.

Generalized Operation

Figure 3:
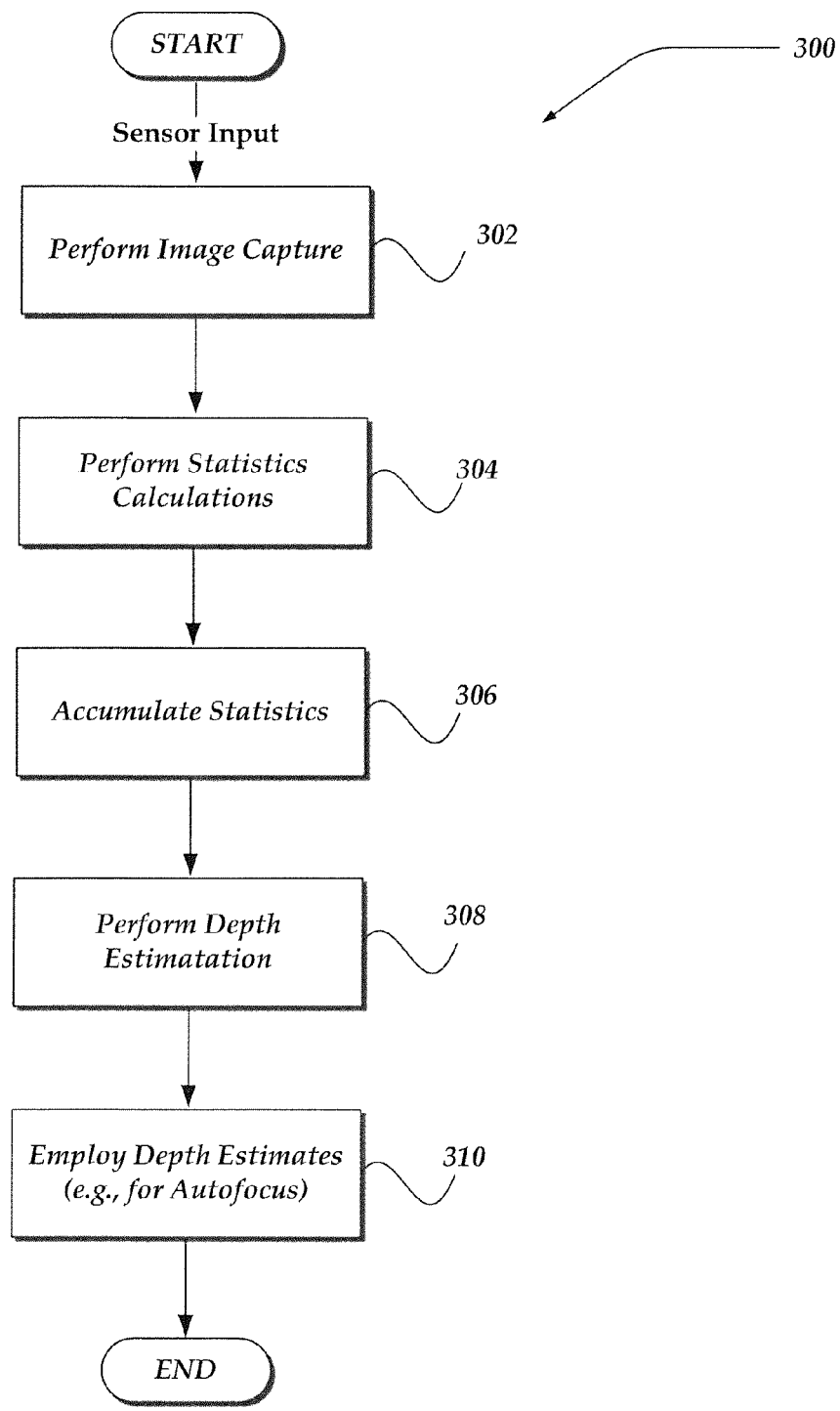
FIG. 3 illustrates one embodiment of process flow usable to generally perform depth estimation as disclosed herein.
Figure 4:
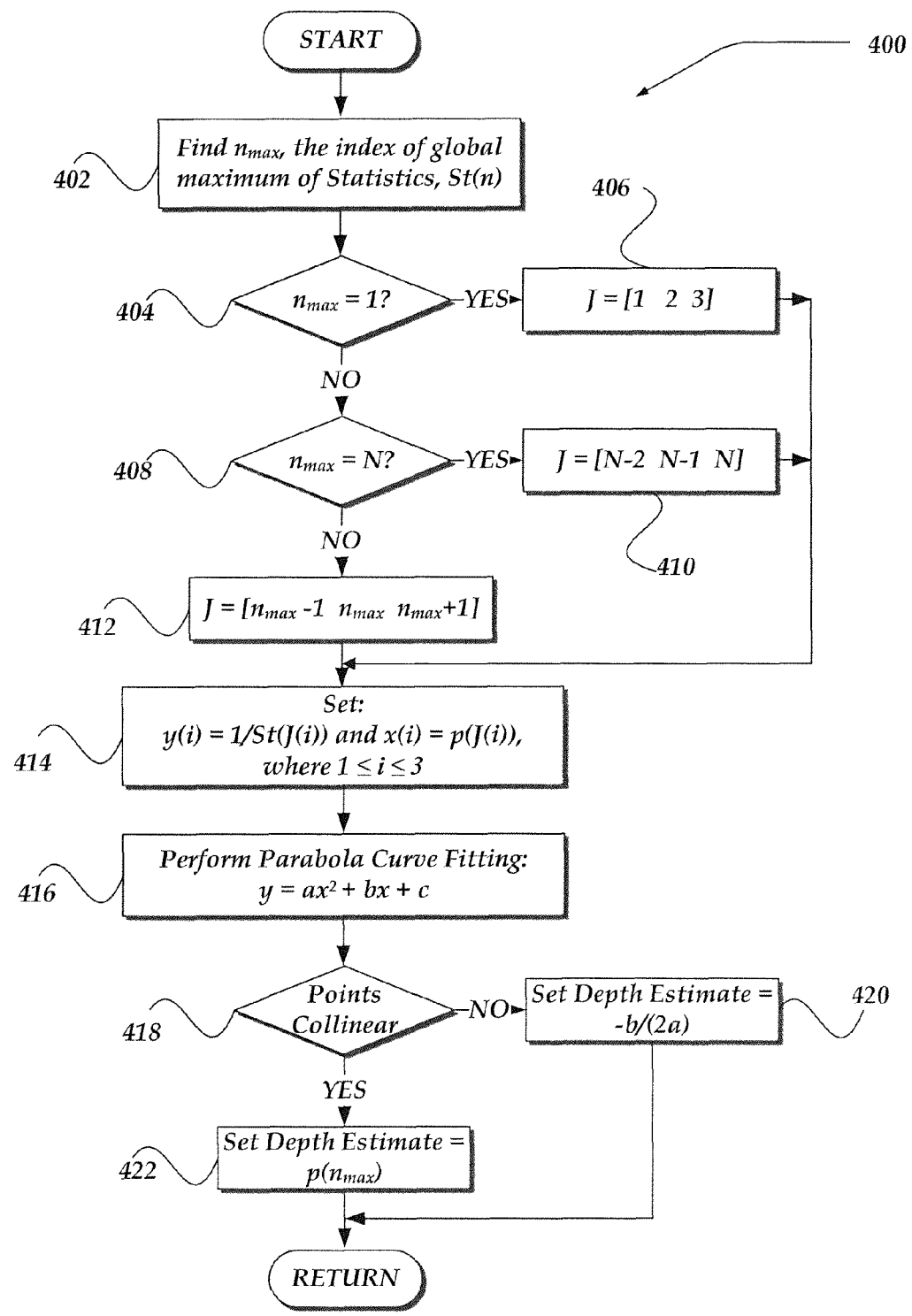
FIG. 4 illustrates one embodiment of process flow usable within the process of FIG. 3 to perform depth estimation based on interpolation of inverse focus statistics.
Figure 5:
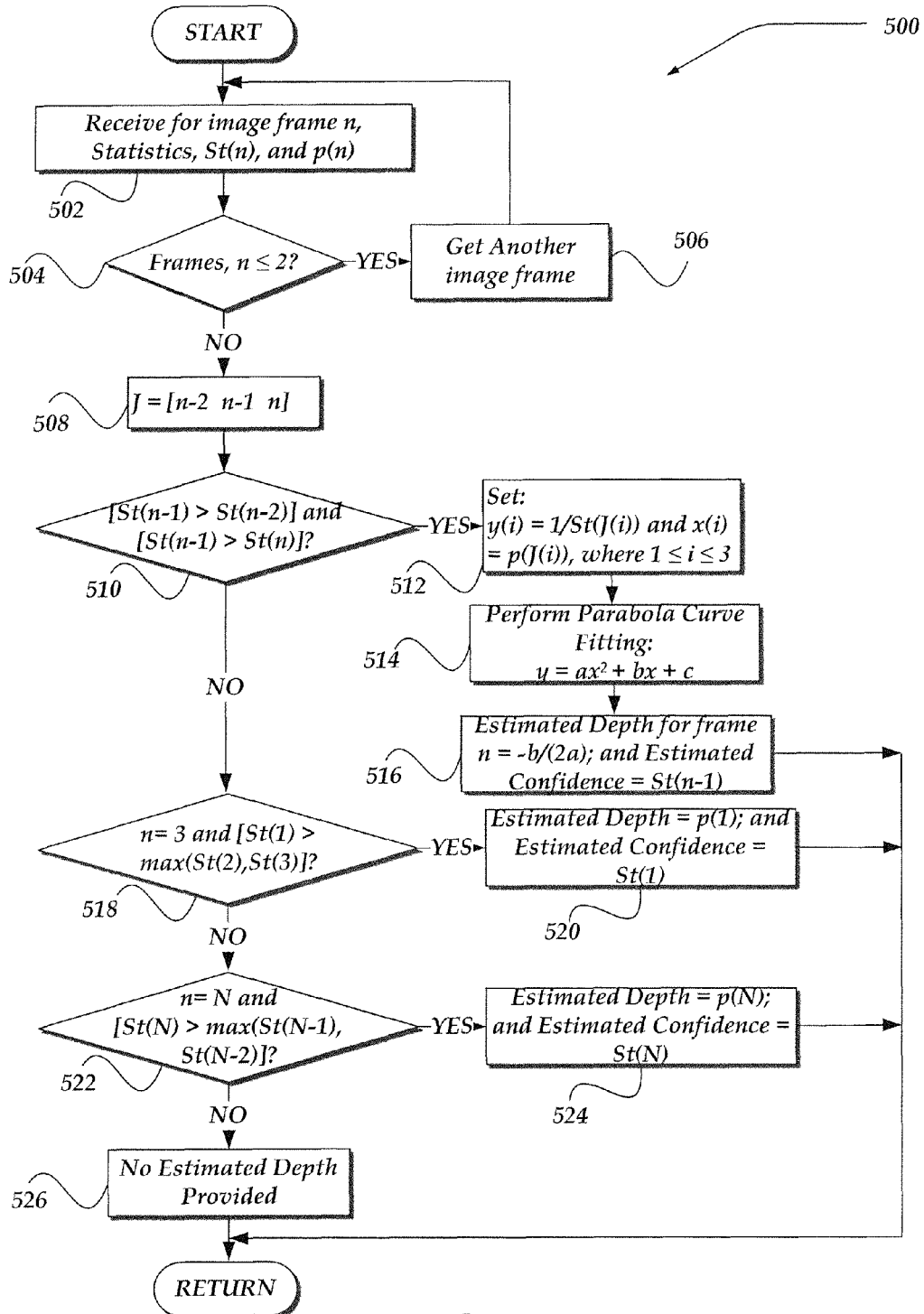
FIG. 5 illustrates another embodiment of process flow usable within a modified process of FIG. 3 to perform depth estimation based on interpolation of inverse focus statistics.
Figure 6:
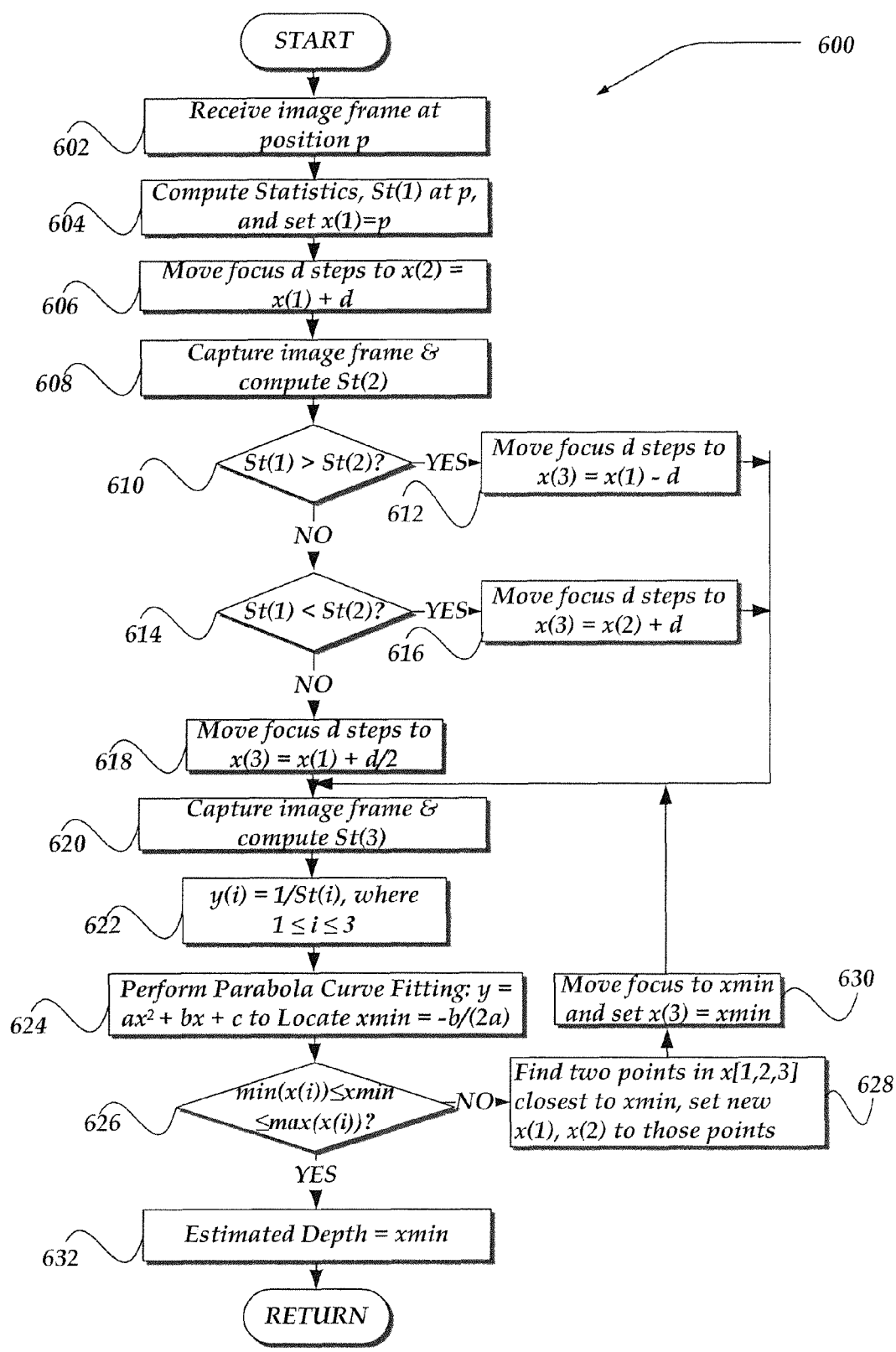
FIG. 6 illustrates still another embodiment of process flow usable within another modified process of FIG. 3 to perform depth estimation based on interpolation of inverse focus statistics.

The operation of certain aspects of the invention will now be described with respect to FIGS. 3-6. FIG. 3 illustrates one embodiment of process flow usable to generally perform depth estimation. FIGS. 4-6 illustrate various embodiments of sub-process flows useable within process 300 of FIG. 3 or within modified versions of process 300 to estimate depth.

Process 300 of FIG. 3 begins at block 302, where a plurality of images may be captured. Typically, these images may be captured during a pre-capture phase of the digital imaging device, such as might occur, for example, when a user partially depresses a capture button, or performs a similar action. However, the subject innovations are not so constrained, and the plurality of images may be captured based on other criteria, as well.

In any event, sensor data may be received, for example, as raw Bayer image data via image capture sensors, and converted to a digital form. For example, received image data may represent a single image frame within a plurality of images. As used herein, the term frame therefore may also represent a single image, or a single image within a sequence of images. In any event, in some embodiments, the image frame may be coded using any of a variety of mechanisms including those defined by the Joint Video Team (JVT) of the ISO/IEC Moving Picture Expert Group (MPEG) and the ITU-T Video Coding Experts (VCEG). However, it should be understood that embodiments discussed within are not constrained to a particular type of coding mechanism, and any of a variety of other formats, standards, or the like, may also be used. In any event, an image frame may be divided into a set of pixel arrays, such as 16×16 pixels in size, and each pixel array may then be termed a Macro-Block (MB). In one embodiment, a Macro-Block may also be referred to as a Minimal Codec Unit (MCU). It should be recognized that other pixel array sizes may also be employed, including for example, 8×8, 64×64, or even pixel arrays where a number of rows are different from a number of columns within the pixel array. In any event, each MB may be further divided into a plurality of blocks, such as into four blocks, each of 8×8 pixels. However, other sizes of blocks may also be selected.

In one embodiment, an image frame may be obtained from an analog source, and be represented by red (R), green (G), and blue (B) lines that may be converted into color difference components using, for example, various processes. For example, in one embodiment, such color difference components may be obtained based on the Rec. 601 (formally known as the CCIR-601) component color television standard from the International Telecommunication Union (ITU) Radio communication Sector (ITU-R). However, any of a variety of other techniques may also be employed, and embodiments are not constrained to a particular standard, or format. In any event, by way of example only, the image data may be defined by three components of the image signal; namely, a luminance component (Y), and two complementary chrominance (color differences) components (V=R−Y) and (U=B−Y). For three dimensional or higher dimensional images, and/or other types of image representations, other components may also be included.

In one example, each image sub-block may be formed of a given number of pixels of the image. A Y block, may comprise 16 pixels horizontally and 16 lines of pixels vertically. Where the image data includes a color signal, then the image sub-blocks further include color information in the form of chrominance components, Cb and Cr, where Cb and Cr are the blue-difference (U) and red-difference (V) components, respectively. Each of the color components may be represented by respectively superimposed color blocks.

Various mechanisms may be employed to convert the RGB data signals into color difference components, including for example using a matrix circuit to provide the luminance (Y), and chrominance (Cb, Cr) component signals. In one embodiment, the luminance component and the chrominance components may be received as analog signals that are provided to respective low pass (or equal bandwidth) filters and passed through analog-to-digital converters, to generate a digital data format. In one embodiment, the filtered and digitized luminance and chrominance components may be supplied to a block forming circuit, in one embodiment, where the described image blocks may be formed.

Also, another format for representing image frame is called the Bayer Format. In at least one embodiment of the Bayer Format, half of the total number of pixels are green (G), while a quarter of the total number are assigned to each of red (R) and blue (B). Other configurations may also be used.

In any event, the image frame data may be provided to block 304, where various statistics, sometimes called focus measures are calculated. In some embodiments, the statistics may be calculated by applying a high pass filter to the image frame data, and then combining the output of the filter over a predefined sub-window, such as a MB, or the like. In one embodiment, the high pass filter is configured to extract a green (G) component of the image frame data. In some embodiments, the results of the filter provide a measurement of the high frequency content of the image frame data.

For example, the filter could be a horizontal difference operator [−1 1], a vertical difference operator $[-1\ 1]^T$, a vertical Sobel operator, such as:

$$\begin{bmatrix} -1 & 0 & 1 \\ -2 & 0 & 2 \\ -1 & 0 & 1 \end{bmatrix}$$

or as a horizontal Sobel operator, such as:

$$\begin{bmatrix} 1 & 2 & 1 \\ 0 & 0 & 0 \\ -1 & -2 & -1 \end{bmatrix}.$$

The combining of the output of the filter may include summing the squared values, or absolute values of the output, over a defined window or sub-window. In some embodiments, the statistics can be calculated as a sum of squares (absolute) values of both the horizontal and vertical operators. In some embodiments, the statistics can be calculated as a maximum absolute value of the filter output over the defined window, or sub-window (e.g., MB). Thus, for a given image frame, the output of block 304 may be a matrix (comprising statistics) of statistics, where each 'cell' within the matrix represents the statistics for a given sub-window (e.g., MB) for the image frame.

Traditionally, the statistics might be calculated at several predefined focusing points by changing a camera focus position and capturing an image at each of these points. The statistics at all points may then be accumulated in a buffer or other storage location at block 306.

In traditional approaches, if all possible focusing positions are used, this might typically include two dozen points to upwards of a couple of hundred to even more than a thousand points, depending on characteristics of the digital imaging device used. Performing a depth from focus (DFF) analysis could involve analysis over the entire set of focusing positions. However, in practice, it may not be practicable to capture images at all the possible focusing positions, especially in applications such as automatic focusing.

The subject innovations disclosed herein are directed towards providing a novel approach to this issue, and others, in part by finding a reasonable subset of focusing points from which depth is estimated by using (interpolating) inverse values of corresponding statistics.

Such depth estimation is performed at block 308 of FIG. 3. Block 308 is described in more detail below in conjunction with FIGS. 4-6. Briefly, however, each of the processes discussed below selects three focusing points from which statistics are obtained. The three points are then used to find a parabolic minimum using inverse statistic. The minimum location may then be determined to be useable as the estimate for depth.

The depth estimate from block 308 may then be provided to block 310, to be used in performing any of a variety of operations, including, for example, automatic focusing, converting 2D images to 3D images, or any other action that might employ depth values for an image. Process 300 may then end.

FIG. 4 illustrates one embodiment of process flow usable within the process of FIG. 3 to perform depth estimation based on interpolation of inverse focus statistics. That is, process 400 of FIG. 4 may be used to perform depth estimation within block 308 of FIG. 3.

Process 400 is initially provided with N statistics, St(n), that are sampled at N focusing points p(n), where $1 \leq n \leq N$. The value for N may be determined in some embodiments, based on various optical characteristics of the digital imaging device. Typically, N may range between about 3 to about 30; although N may also be larger. However, when N becomes larger than about 100, the process may become slower. Engineering judgment then be used to further define N. Thus, in some embodiments, a reasonable value of N might be around 10, or so. In any event, the selection of the focusing points of interest from within the N value are those focusing points, p(n), that are not typically contiguous. In one non-limiting, non-exhaustive example, the selected focusing points might, be a first point, a tenth point, and a fourteenth point. In another embodiment p(n)−p(n−1) is constant for all $2 \leq n \leq N$. Other values can clearly be selected. Again, the selection of such points may be based on engineering judgment, and/or optical characteristics of the digital imaging device. In one embodiment, data indicating N, and/or the points to select may be stored in storage within the digital imaging device.

In any event, at block 402, an index of the global maximum of St(n) is found using $n_{max}$=argmax(St(n)). That is, $n_{max}$ is that point of the given argument for which the given function attains its maximum value.

Next, three points are selected as parameters within the vector space J. This is achieved by, flowing to decision block 404, where a determination is made whether $n_{max}$ equals 1, or is the first focusing point. If not, then processing flows to decision block 408. If so, then processing flows to block 406, where J is set to include points 1, 2, and 3. Processing then flows to block 414. At decision block 408, if it is determined that $n_{max}$ is equal to N, then J may be set to include points N−2, N−1, and N. Processing then flows to block 414. Otherwise, if decision blocks 404 and 408 fail (are both false), then flowing to block 412, J is set to include points $n_{max}-1$, $n_{max}$, and $n_{max}+1$. Processing then flows to block 414.

At block 414, y(i) is then set to 1/St(J(i)), and x(i) is set to p(J(i)), where $1 \leq i \leq 3$. However, in other embodiments, y(i) might be set to $1/St^2(J(i))$. In other embodiments, y(i) may be set to other inverse relationships of the statistics, St.

Continuing next to block 416, the three points are then used to fit a parabola, $y=ax^2+bx+c$, where a, b, and c are parameters to be determined. Any of a variety of approaches may be used to perform such curve fitting, including, but not limited to least squares approach, interpolation, regression analysis, or the like. Thus, solving the equation may be performed using a variety of techniques, and the subject innovations are not constrained to a particular approach.

In any event, processing flows next to decision block 418, where a determination is made whether the three points in x(i), y(i) are determined to be collinear. If they are, then processing flows to block 422; otherwise, processing flows to block 420. As an aside, the points are more likely to be collinear, when $n_{max}$ is either 1 or N. In any event, if they are collinear, then at block 422, the depth estimate is set to $p(n_{max})$. Otherwise, at block 420, the depth estimate is set to the minimum location of the estimated parabola, which is −b/(2a), as determined from block 416. Processing then returns to a calling process. As noted above, the calling process might be process 300 of FIG. 3.

Further, it is possible to use a similar parabolic-minimum procedure with a progressive scheme. One such progressive scheme is described in U.S. patent application Ser. No. 13/183,363, entitled "Method for Progressively Determining Depth From Defocused Images," by Meir Tzur and Guy Rapaport, filed Jul. 14, 2011, and which is incorporated herein in its entirety. However, in this instance, a modified version of the process of FIG. 3 is employed, where an estimated depth is calculated after processing of each input image frame.

Therefore, FIG. 5 illustrates another embodiment of process flow usable within a modified process of FIG. 3 to perform depth estimation based on interpolation of inverse focus statistics. Thus, progressive process 500 of FIG. 5, is responsible for handling and merging individual estimated depths and confidences (measurements) that are calculated for each image frame.

Therefore, process 500 begins, after a start block, block 502, where the image frame data for frame n, including statistics, St(n), and p(n), are received. Flowing next to decision block 504, a determination is made whether three image frames have been received. If not, the processing loops to block 506, where another image frame is captured, and to block 502, where associated statistics, and focusing point data is received.

If three image frames have been obtained, then processing flows to block 508, where the vector J is set to [n−2, n−1, n]. The estimated depth and confidence are then determined by, flowing to decision block 510, wherein a determination is made whether the statistics for focusing point n−1 are greater than the statistics for both focusing points n and n−2. If so, then processing flows to block 512; otherwise, processing flows to decision block 518.

At decision block 518, a determination is made whether n is equal to 3, and the statistics for focusing point 1 is greater than the maximum of the statistics of focusing points 1 and 2. If so, then processing flows to block 520; otherwise, processing flows to decision block 522.

At decision block 522, a determination is made whether n is equal to N and the statistics for focusing point N is greater than the maximum of the statistics of focusing points N−1 and N−2. If so, then processing flows to block 524; otherwise, processing flows to block 526, where no estimate of depth might be determinable for the given points. In such instance, another set of points might be obtained, or process 500 might return.

However, where a depth estimate is determinable, processing continues. Thus, at block 512, y(i) is then set to $1/St(J(i))$, and x(i) is set to $p(J(i))$, where $1 \le i \le 3$. However, in other embodiments, y(i) might be set to $1/St^2(J(i))$. In other embodiments, y(i) may be set to other inverse relationships of the statistics, St. Continuing to block 514, any of a variety of curve fitting techniques may then be used for the values of x, y determined at block 512 to fit the parabola $y=ax^2+bx+c$. Processing then flows to block 516, where the parabola's minimum, $x_{min}=-b/(2a)$ is then used as the estimated depth. Additionally, a confidence may be determined for this process as St(n−1). Processing then returns.

At block 520, however, the estimated depth is set to p(1), and the confidence is set to St(1). Processing then returns. At block 524, the estimated dept is set to p(N), and the confidence is set to St(N). Processing then returns.

While processes 400 and 500 provide two approaches to employing a parabolic-minimum procedure for estimating depth, other approaches are also considered that employ inverse statistics. Thus, FIG. 6 illustrates still another embodiment of process flow usable within another modified process of FIG. 3 to perform depth estimation based on interpolation of inverse focus statistics. In particular, the process 600 of FIG. 6 provides a continuous AF scheme. In this approach, a starting point of the AF scheme is a current focus position. For example, the current focus position might represent a focus position obtained when the image capture device is first 'turned on.' However, the current focus position might represent a current focus position from a previous image capture session, a previous focusing session or the like. In any event, process 600 is then directed towards seeking a correct focus position for the image scene. As such, process 600 also employs a modified process 300 of FIG. 3 as discussed below.

Process 600, therefore begins, after a start block, at block 602, where for the image frame data for the current position, p, is received. Flowing next to block 604, the statistics, St(1) are computed, and x(1) is set to the current position, p.

Continuing to block 606, the focus for the digital imaging device is moved d steps forward, in relationship to the current focus position. A value for d may be determined based on various characteristics of the digital imaging device, and may be stored in the digital imaging device during, for example, a calibration procedure, during manufacturing, or the like. In some embodiments, d might range about 3 steps to 20 steps. Other values are also considered. In any event, x(2) is then set to x(1)+d.

Processing continues to block 608, where another image frame is captured. As an aside, as discussed above, such image frame capture might be performed within a pre-capture sequence, such as when a capture button is partially depressed, or the like. In any event, at block 608, the statistics for this second image are then computed.

Moving next to decision block 610, a determination is made how to acquire a third image frame and related data. Thus, at decision block 610, a determination is made whether the statistics for position 1 are greater than the statistics for position 2. If so, then processing flows to block 612, where the focus for the digital imaging device is moved −d steps forward, in relationship to the first focus position. That is, x(3)=x(1)−d. Processing then flows to block 620.

However, if at decision block 610, the statistics for position 1 are not greater than those for position 2, then processing flows to decision block 614, where a determination is made whether the statistics for position 1 are less than those for position 2. If so, then processing flows to block 616, where the focus for the digital imaging device is moved +d steps forward, in relationship to the second focus position. That is, x(3)=x(1)+d. Processing then flows to block 620.

If, however, neither decision blocks 610 or 614 are value, processing flows to block 618, where the third image position is set to x(3)=x(1)+(d/2). Processing then flows to block 620.

At block 620, the third image frame is captured at the defined focus position, x(3), and the statistics for the third captured (pre-capture) image frame are computed as St(3). Continuing next to block 622, y(i) is then set to $1/St(i)$, where $1 \le i \le 3$. However, in other embodiments, y(i) might be set to $1/St^2(i)$. In other embodiments, y(i) may be set to other inverse relationships of the statistics, St. Flowing next to block 624, where the three x(i), y(i) points are used to fit a parabola, $y=ax^2+bx+c$. Further, a parabola minimum, $x_{min}$ is determined as $-b/(2a)$. Again, as discussed above, any of a variety of techniques may be used to perform the curve fitting.

Process 600 flows next to decision block 626, to determine whether process 600 should be terminated, or seek a revised set of points. Thus, at decision block 626, a determination is made whether $\min(x(i)) \le x_{min} \le \max(x(i))$. If $x_{min}$ is not between the minimum and maximum x positions, then processing moves to block 628; otherwise, processing the estimated depth is set to the value of $x_{min}$, and process 600 returns.

At block 628, two points are found in [x(1), x(2), x(3)] which are closest in proximity to $x_{min}$. That is, the two points to be identified have the smallest absolute difference value: $|x(i)-x_{min}|$. The identified two points are then used to set new values for x(1) and x(2). X(3) is set to equal $x_{min}$. Process 600 flows to block 630, where the focusing position is moved to $x(3)=x_{min}$. Processing continues to block 620, where a new third image frame is captured and its related statistics, St(3) are calculated.

As discussed above, processes 400, 500, and 600 are but three possible implementations useable to perform a curve-fitting using inverse statistics to estimate depth as a location of a minimum value. Other mechanisms are also useable. Thus, the subject innovations are not to be construed as being limited to a particular implementation for estimating depth based on inverse statistics.

Moreover, it will be understood that each component of the flowcharts and combinations of components in these illustrations, can be implemented by computer program instructions. These program instructions may be provided to a processor to produce a machine, such that the instructions, which execute on the processor, create means for implementing the actions specified in the flow component or components. The computer program instructions may be executed by a processor to cause a series of operational steps to be performed by the processor to produce a computer-implemented process such that the instructions, which execute on the processor to provide steps for implementing the actions specified in the flow component or components. The computer program instructions may also cause at least some of the operational steps shown in the components of the flows to be performed in parallel. Moreover, some of the steps may also be performed across more than one processor, such as might arise in a multi-processor computer system. In addition, one or more components or combinations of components in the flow illustrations may also be performed concurrently with other components or combinations of components, or even in a different sequence than illustrated.

Accordingly, components of the flow illustrations support combinations of means for performing the specified actions, combinations of steps for performing the specified actions and program instruction means for performing the specified actions. It will also be understood that each component of the flow illustrations, and combinations of components in the flow illustrations, can be implemented by special purpose hardware-based systems, which perform the specified actions or steps, or combinations of special purpose hardware and computer instructions.

A Brief Discussion Regarding Benefits of Using Inverse Statistics $1/St^Z(n)$, where $Z \geq 1$.

Interpolating the inverse-statistics and setting the estimated depth as the location of the minimum value are directed towards improving the estimates over traditional techniques that use the statistics and look for the location of maximum value. One of the reasons for the expected better performance is that the square of the inverse statistics as a function of focus step can be modeled as having parabolic behavior. Therefore, using parabolic interpolation of the square of inverse statistics better estimates the location of inverse squared statistics minimum (which is the estimated depth).

Figure 7:
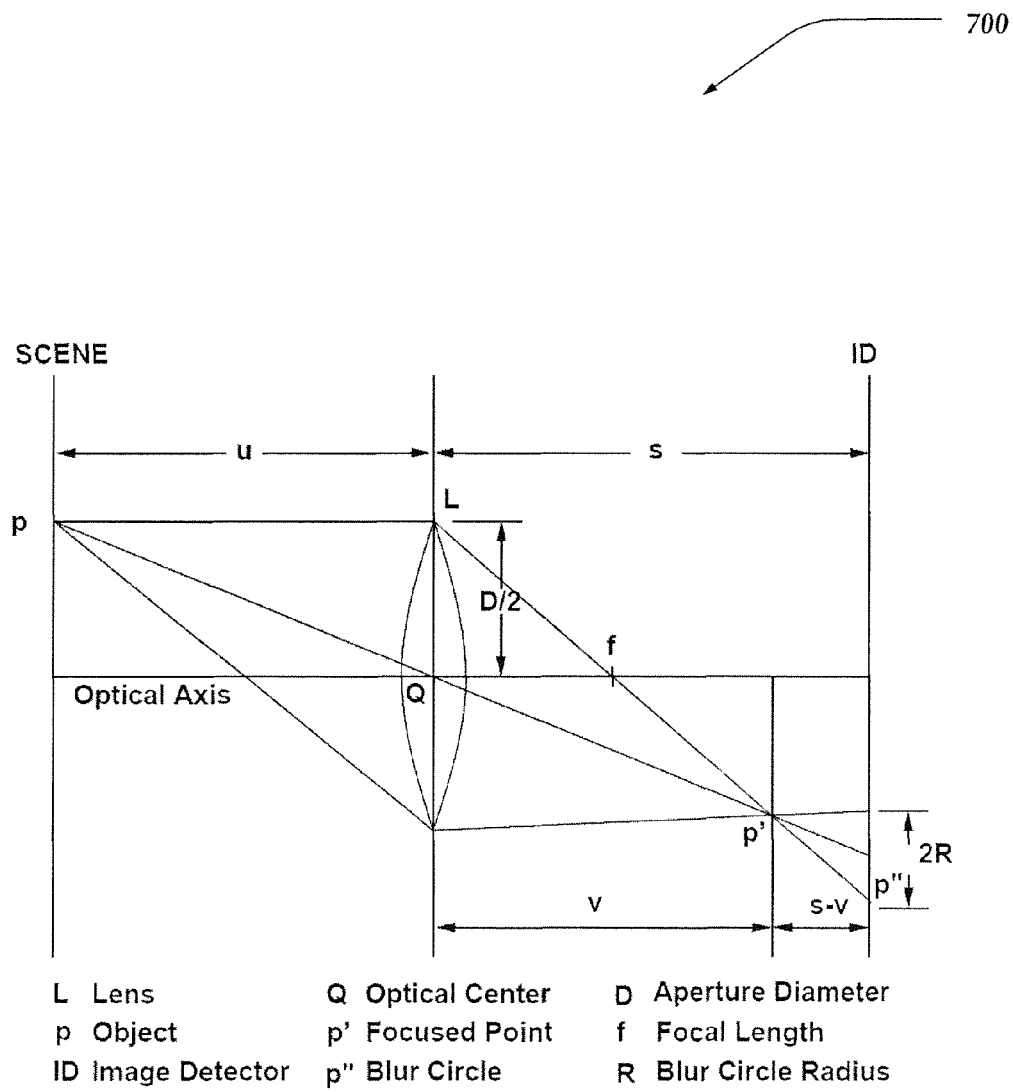
FIG. 7 illustrates one non-limiting, non-exhaustive example of a lens model usable to disclose various aspects of the subject innovations as discussed herein.

Consider a non-limiting, non-exhaustive example of a standard lens model 700 as illustrated in FIG. 7. As shown, R represents the blur circle radius. Thus, using the lens maker's formula $$\frac{1}{f} = \frac{1}{u} + \frac{1}{v},$$

one can show that:

$$R = s\frac{D}{2}\left(\frac{1}{f} - \frac{1}{u}\right) - \frac{D}{2}$$

That is, for a given object distance, the blur radius is a linear function of the distance between the sensor ID and the lens L.

In practice, the blur circle may be modeled by a Point Spread Function (PSF) of the lens. When modeling the PSF as a 2D Gaussian function with a width, σ, it can be found that $\sigma = k|R|$, where k is a camera dependent constant.

It is possible to show that σ is inversely proportional with the statistics. For example, consider an ideal step function of height A as an input image and a Gaussian PSF with a σ width as the lens model. The output image will be a convolution of PSF and the input image:

$$I(x) = \int_{-\infty}^{x} \frac{A}{\sqrt{2\pi}\,\sigma} \exp\left(-\frac{x'^2}{2\sigma^2}\right) dx'$$

As was noted above, a first step in calculating statistics is applying a high pass filter to the image. In one embodiment, such a high pass filter can be modeled as a gradient function:

$$\nabla I(x) = \frac{A}{\sqrt{2\pi}\,\sigma} \exp\left(-\frac{x^2}{2\sigma^2}\right)$$

The next step in calculating the statistics is summing the squared values of the sampled gradient function. This can be modeled as integrating the square gradient. Therefore, the statistics can be modeled as:

$$St = \int_{-\infty}^{\infty} [\nabla I(x)]^2 dx = \frac{A^2}{\sqrt{2\pi}\,\sigma}$$

It may then be observed that the absolute value of the blur radius is inversely proportional to the statistics and $$\frac{1}{St} = \frac{2\sqrt{\pi}}{A^2} k|R|$$

Further, since the blur radius is a linear function of the distance between the sensor and the lens, and assuming that the focus step is also linear with a distance between the sensor and the lens, it can be found that square of the inverse statistics as a function of focus step can be modeled as having parabolic behavior. Thus, the depth may be estimated based on interpolation of an inverse focus statistic, rather than a regular (non-inverse) focus statistic. Moreover, it is expected that using the inverse focus statistics will improve the accuracy of the estimated depth since it fits nicer the above model of a focus lens.

Further, the interpolation can be done with a spacious sampling of the focusing locations, requiring less focus points for depth estimation (less than in the case of using regular statistics, for example). This in turn is directed towards decreasing the time consumed for depth estimation, which may have relevance in such applications, as auto focusing.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A processor based method, comprising:
   receiving a plurality of image frames from an image sensor;
   receiving for each of the plurality of image frames, an image statistic and a focusing position;
   calculating for each of the plurality of image statistics, an inverse of each of the statistics;
   performing a curve fitting determination using the inverse statistics and focusing positions to locate a minimum location on a curve; and
   selectively employing the minimum location as an estimated depth.

2. The method of claim 1, wherein the curve fitting determination employs interpolation of the inverse statistics and focusing positions on a parabolic curve.

3. The method of claim 1, wherein the plurality of image statistics is obtained by passing each of the plurality of image frames through a high pass filter and further summing filter output values over a predefined window.

4. The method of claim 1, wherein the curve fitting uses an inverse of a square of the statistics.

5. The method of claim 1, wherein performing a curve fitting determination further comprises:
  finding an index of a global maximum of the statistics as nmax;
  setting three points in J according to:
    when nmax equals 1, setting J=[1, 2, 3];
    else, when nmax equals N, a maximum number statistics received, setting J=[N−2, N−1, N]; and
    otherwise, setting J=[nmax−1, nmax, nmax+1];
  setting $y(i)=1/statistic(J(i))$, and setting $x(i)$=focusing position $(J(i))$, where $1 \leq i \leq 3$;
  fitting a parabola, $y=ax^2+bx+c$, using the set $x(i)$, $y(i)$ points;
  when it is determined that the three $x(i)$, $y(i)$ points are not collinear, setting the estimated depth as the minimum location of the parabola, $xmin=-b/(2a)$; and
  otherwise, setting the estimated depth as focusing position at nmax.

6. The method of claim 1, wherein performing a curve fitting determination further comprises:
  when the plurality of image frames, n, received are greater than two, n>2, setting a vector J=[n−2, n−1, n];
  when (the statistics for frame n−1 is greater than the statistics for frame n−2) and (the statistics for frame n−1 is greater than the statistics for frame n):
    setting $y(i)=1/statistics(J(i))$, and $x(i)$=focusing positions $(J(i))$, for $1 \leq i \leq 3$,
    performing the curve fitting using a parabola, $y=ax2+bx+c$ and the three $x(i)$, $y(i)$ points, to employ the minimum location, $xmin=-b/(2a)$, as the estimated depth;
  else, when (n=3 and the statistics for frame 1 is greater than a maximum of (the statistics of frame 2, statistics of frame 3)):
    setting the estimated depth as a focusing position of frame 1; and
  else, when (n=N, a maximum number of image frames, and the statistics for frame N is greater than a maximum of (the statistics of frame N−1, statistics of frame N−2)):
    setting the estimated depth as the focusing position of frame N.

7. The method of claim 1, wherein performing a curve fitting determination and wherein receiving for each of a plurality of image frames, a image statistic and a focusing position, further comprises:
  receiving a first image statistic for a first image frame at a first focusing position, $x(1)$;
  relocating a focusing position for the image sensor by d steps ahead of the first focusing position, receiving a second image frame having a second image statistic and wherein a second focusing position is determined as $x(2)=x(1)+d$;
  when the first image statistic is greater than the second image statistic, setting a third focusing position, as $x(3)=x(1)-d$;
  else, when the first image statistic is less than the second image statistic, setting the third focusing position, as $x(3)=x(2)+d$;
  otherwise, setting the third focusing position, as $x(3)=x(1)+(d/2)$;
  receiving a third image frame and related statistic using the third focusing position;
  setting $y(i)=1/statistics(i)$, for $1 \leq i \leq 3$;
  fitting a parabola, $y=ax^2+bx+c$, using the set $x(i)$, $y(i)$ points;
  finding the minimum location, of $xmin=-b/(2a)$;
  when minimum of $(x(1), x(2), x(3)) \leq xmin \leq$ maximum of $(x(1), x(2), x(3))$, using xmin as the estimated depth; else
  identifying two points in $[x(1), x(2), x(3)]$ which are closest to xmin, and using the identified two points to set a new $x(1)$ and $x(2)$, setting a new focusing position $x(3)=xmin$, acquiring a new third image frame and related statistics using the new focusing position $x(3)$ and further setting a new $y(i)=1/statistics(i)$, for $1 \leq i \leq 3$.

8. An image system, comprising:
  an image sensor device that is configured to receive image frames; and
  one or more circuits having a plurality of components thereon operating to perform a plurality of actions, including:
    receiving for each of a plurality of image frames, an image statistic and a focusing position;
    calculating for each of the plurality of image statistics, an inverse of each of the statistics;
    performing a curve fitting determination using the inverse statistics and focusing positions to locate a minimum location on a curve; and
    selectively employing the minimum location as an estimated depth.

9. The image system of claim 8, wherein the curve fitting determination employs interpolation of the inverse statistics and focusing positions on a parabolic curve.

10. The image system of claim 8, wherein the plurality of image statistics is obtained by passing each of the plurality of image frames through a high pass filter and further summing filter output values over a predefined window.

11. The image system of claim 8, wherein the curve fitting uses an inverse of a square of the statistics.

12. The image system of claim 8, wherein performing a curve fitting determination further comprises:
  finding an index of a global maximum of the statistics as nmax;
  setting three points in J according to:
    when nmax equals 1, setting J=[1, 2, 3];
    else, when nmax equals N, a maximum number statistics received, setting J=[N−2, N−1, N]; and
    otherwise, setting J=[nmax−1, nmax, nmax+1];
  setting $y(i)=1/statistic(J(i))$, and setting $x(i)$=focusing position $(J(i))$, where $1 \leq i \leq 3$;
  fitting a parabola, $y=ax^2+bx+c$, using the set $x(i)$, $y(i)$ points;
  when it is determined that the three $x(i)$, $y(i)$ points are not collinear, setting the estimated depth as the minimum location of the parabola, $xmin=-b/(2a)$; and
  otherwise, setting the estimated depth as focusing position at nmax.

13. The image system of claim 8, wherein performing a curve fitting determination further comprises:
  when the plurality of image frames, n, received are greater than two, n>2, setting a vector J=[n−2, n−1, n];
  when (the statistics for frame n−1 is greater than the statistics for frame n−2) and (the statistics for frame n−1 is greater than the statistics for frame n):
    setting $y(i)=1/statistics(J(i))$, and $x(i)$=focusing positions $(J(i))$, for $1 \leq i \leq 3$, performing the curve fitting using a parabola, $y=ax2+bx+c$ and the three $x(i)$, $y(i)$ points, to employ the minimum location, $xmin=-b/(2a)$, as the estimated depth;

else, when (n=3 and the statistics for frame 1 is greater than a maximum of (the statistics of frame 2, statistics of frame 3)):

setting the estimated depth as a focusing position of frame 1; and else, when (n=N, a maximum number of image frames, and the statistics for frame N is greater than a maximum of (the statistics of frame N−1, statistics of frame N−2)):

setting the estimated depth as the focusing position of frame N.

14. The image system of claim 8, wherein performing a curve fitting determination and wherein receiving for each of a plurality of image frames, a image statistic and a focusing position, further comprises:

receiving a first image statistic for a first image frame at a first focusing position, $x(1)$;

relocating a focusing position for the image sensor device by d steps ahead of the first focusing position, receiving a second image frame having a second image statistic and wherein a second focusing position is determined as $x(2)=x(1)+d$;

when the first image statistic is greater than the second image statistic, setting a third focusing position, as $x(3)=x(1)-d$;

else, when the first image statistic is less than the second image statistic, setting the third focusing position, as $x(3)=x(2)+d$;

otherwise, setting the third focusing position, as $x(3)=x(1)+(d/2)$;

receiving a third image frame and related statistic using the third focusing position;

setting $y(i)=1/statistics(i)$, for $1 \leq i \leq 3$;

fitting a parabola, $y=ax^2+bx+c$, using the set $x(i)$, $y(i)$ points;

finding the minimum location, of $xmin=-b/(2a)$;

when minimum of $(x(1), x(2), x(3)) \leq xmin \leq$ maximum of $(x(1), x(2), x(3))$, using xmin as the estimated depth; else identifying two points in $[x(1), x(2), x(3)]$ which are closest to xmin, and using the identified two points to set a new $x(1)$ and $x(2)$, setting a new focusing position $x(3)=xmin$, acquiring a new third image frame and related statistics using the new focusing position $x(3)$ and further setting a new $y(i)=1/statistics(i)$, for $1 \leq i \leq 3$.

15. A non-transitory storage device having stored thereon a plurality of computer-executable instructions that when installed on a digital camera performs actions, comprising:

receiving a plurality of image frames from an image sensor;

receiving for each of the plurality of image frames, a image statistic and a focusing position;

calculating for each of the plurality of image statistics, an inverse of each of the statistics;

performing a curve fitting determination using the inverse statistics and focusing positions to locate a minimum location on a curve; and selectively employing the minimum location as an estimated depth.

16. The storage device of claim 15, wherein the curve fitting determination employs interpolation of the inverse statistics and focusing positions on a parabolic curve.

17. The storage device of claim 15, wherein the plurality of image statistics is obtained by passing each of the plurality of image frames through a high pass filter.

18. The storage device of claim 15, wherein the curve fitting uses an inverse of a square of the statistics.

19. The storage device of claim 15, wherein the statistics are obtained using a difference operator.

20. The storage device of claim 15, wherein performing a curve fitting determination further comprises employ a parabolic minimum technique with a progressive image capture to obtain the estimated depth.

* * * * *